United States Patent [19]
Moody

[11] 3,782,215
[45] Jan. 1, 1974

[54] FREELY MOUNTED GEAR
[76] Inventor: Robert E. Moody, 7202 Gammage, Houston, Tex. 77017
[22] Filed: July 6, 1972
[21] Appl. No.: 269,303

[52] U.S. Cl. .................................. 74/410, 74/413
[51] Int. Cl. ..................... F16h 57/00, F16h 1/20
[58] Field of Search ....................... 74/410, 413, 332

[56] References Cited
UNITED STATES PATENTS
2,884,287  4/1959  Sommer .......................... 74/410 X
3,430,509  3/1969  Couris ................................ 74/413
3,461,735  8/1969  Durand ................................ 74/410

FOREIGN PATENTS OR APPLICATIONS
415,085  8/1934  Great Britain ....................... 74/413

Primary Examiner—Leonard H. Gerin

[57] ABSTRACT

A ring gear arrangement providing an uninterrupted source of power for mechanical and electrical applications. This arrangement consists primarily of a toothed ring supported in rolling engagement with rotatable bearings positioned in an equally spaced apart relationship with each other, the bearings being supported upon a plate or the like.

1 Claim, 5 Drawing Figures

PATENTED JAN 1 1974 3,782,215

FREELY MOUNTED GEAR

This invention relates to gear trains, and more particularly to a freely mounted gear.

It is therefore the primary purpose of this invention to provide a freely mounted gear which will be for use directly in a train of power or may be used as an auxiliary gearing arrangement.

Another object of this invention is to provide a freely mounted gear arrangement which will have ring gear grooved for rolling engagement and support upon a plurality of equally spaced apart bearings, the bearings providing smooth and precise rotation and alignment for the arrangement.

Another object of this invention is to provide an arrangement of the type described, which will have teeth for engagement with the teeth of other gears, such as sun and planetary arrangements.

A further object of this invention is to provide an arrangement of the type described, which will have the bearing members supported upon shaft means extending from a plate or other member of the gear train.

A still further object of this invention is to provide an arrangement which may be adapted for receiving the teeth of other gears from the faces of the ring gear as well as from the gear means on the outer peripheral and inner peripheral toothed areas of the gear.

An even further object of this invention is to provide a gearing arrangement which may be supported upon a dual bearing arrangement, the arrangement being adapted for the races of the bearings to be in rolling engagement with the beveled faces of a ring gear.

Other objects of the present invention are to provide a freely mounted gear which is simple in design, inexpensive to manufacture, rugged in construction, easy to use and efficient in operation.

These and other objects will be readily evident upon a study of the following specification and the accompanying drawing wherein.

Figure 1:
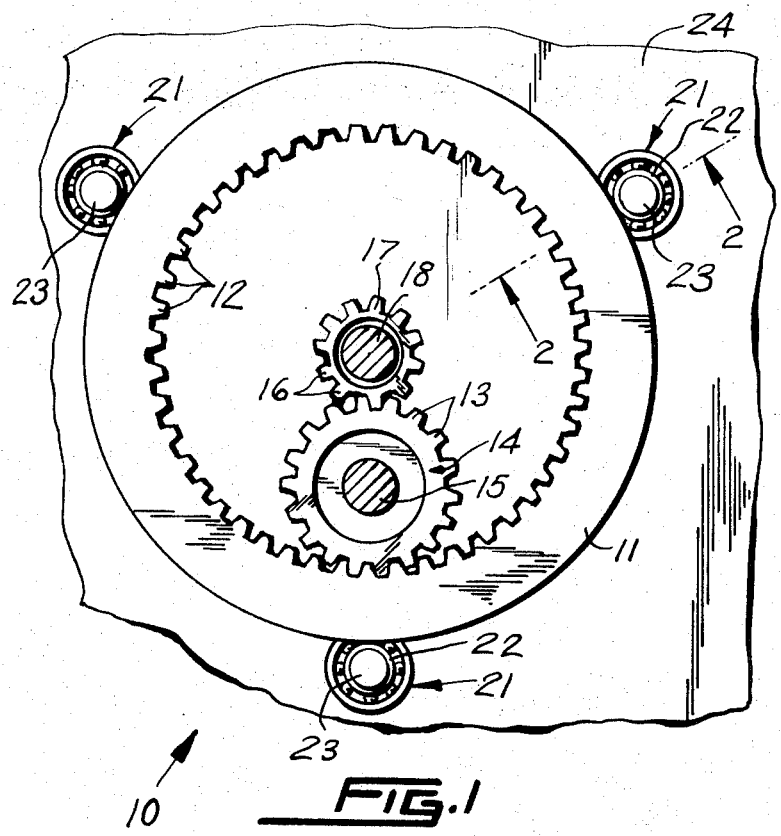
FIG. 1 is a face view of the present invention.

According to this invention, a freely mounted gear 10 is shown to include a large ring 11 having a plurality of equally spaced apart teeth 12 on its inner periphery, the teeth 12 being in engagement with the outer peripheral teeth 13 of gear 14 which is mounted upon shaft 15. The teeth 13 of gear 14 are in engagement with the outer peripheral teeth 16 of gear 17 which is mounted to shaft 18.

Figure 2:
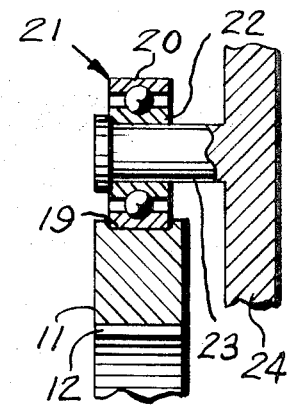
FIG. 2 is an enlarged cross sectional view taken along the line 2—2 of FIG. 1.

Looking now more particularly to FIG. 2 of the drawing, one will see that the ring 11 is provided with an annular groove 19 in which the outer race 20 of bearing 21 is in rolling engagement there with. The inner race 22 of bearings 21 is supported upon shaft 23 extending from the member 24.

It shall further be noted that bearings 21 are equally spaced apart so as to provide even support of ring 11 so as to enable it to remain aligned and free to rotate, the bearings 21 serving to support the ring 11 entirely.

Figure 3:
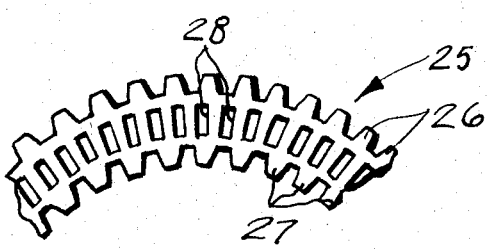
FIG. 3 is a fragmentary face view showing a modified form of ring gear.

Referring now more particularly to a FIG. 3 of the drawing, one will see a modified ring 25 having peripheral outer teeth 26 and inner peripheral teeth 27, the face having openings 28 for receiving gear teeth (not shown).

Figure 4:
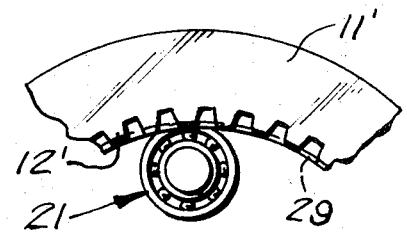
FIG. 4 is a fragmentary face view showing a modified form of bearing mounting.

Referring now to FIG. 4 of the drawing, one will see a modified ring 11' having internal teeth 12', the ring 11' having an annular and inner peripheral groove 29 which is in rolling engagement with bearing 21.

Figure 5:
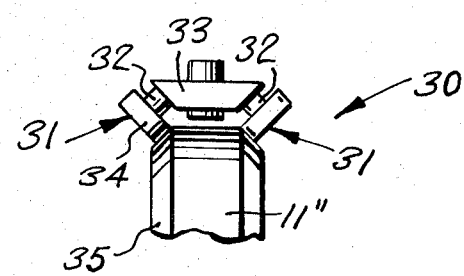
FIG. 5 is an end view of a fragmentary ring gear showing another modified form of bearing mounting.

As will be seen in FIG. 5 of the drawing, a modified bearing mounting arrangement 30 shows angularly spaced apart bearings 31 which are supported on shafts 32 mounted to member 33. The outer races 34 of bearings 31 are in engagement with the beveled face portions 35 of the modified ring 11''.

What I now claim is:

1. A freely mounted gear arrangement, comprising in combination, a large diameter ring having gear teeth on an inner periphery thereof that engage teeth on an outer periphery of a smaller diameter gear which also engages a third gear mounted upon a shaft, a plurality of spaced apart bearing means engaging an outer periphery of said ring for supporting an aligning said ring respective to the second gear, said ring having a face on at least one side thereof, said face having a circular row of openings so to form teeth therebetween and which are engageable by yet another or fourth gear, said ring an angularly inclined face between the first said face and an outer periphery of said ring, said angularly inclined face being at right angle to a second angularly inclined face on an opposite side of said peripheral edge, said angularly inclined faces each being engaged by said spaced apart bearing means, each one of said bearing means comprising a circular wheel supported rotatably on a shaft, said shafts being mounted at right angle to each other on a supporting member, and each wheel having an outer race that engages said diagonally inclined face of said ring.

* * * * *